United States Patent Office 2,880,202
Patented Mar. 31, 1959

2,880,202
MONOAZO DYESTUFFS

Edgar Enders, Leverkusen-Bayerwerk, Germany, assignor to Farbenfabriken Bayer Aktiengesellschaft, Leverkusen, Germany, a corporation of Germany No Drawing. Application September 20, 1955
Serial No. 535,514

Claims priority, application Germany September 28, 1954

4 Claims. (Cl. 260—146)

The present invention relates to monoazo dyestuffs, their metal complex compounds and a process for their manufacture; more particularly it relates to monoazo dyestuffs of the following general formula:

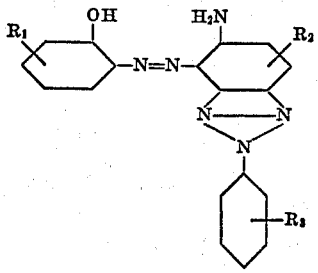

wherein $R_1$, $R_2$ and $R_3$ mean hydrogen or non-ionic substituents, and the chromium and cobalt complexes of said dyestuffs.

It is an object of the present invention to provide a new process for the manufacture of metal-containing monoazo dyestuffs. It is a further object to provide new chromium and cobalt-containing monoazo dyestuffs with good fastness properties.

The new o-hydroxy-o'-amino monoazo dyestuffs according to the invention can be obtained by coupling diazotized 1-amino-2-hydroxy-benzenes, free from sulfonic and carboxylic acid groups which may bear non-ionic substituents, with coupling components of the following general formula:

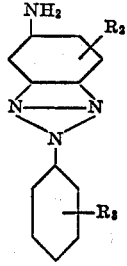

wherein $R_2$ and $R_3$ have the same meaning as above and which are free from sulfonic and carboxylic acid groups.

As diazo components there may be used for example: 1-amino-2-hydroxybenzene and its alkyl-, halogen-, nitro- or acylamino-substitution products; 1-amino-2-hydroxybenzene-5-sulfonamide, 1-amino-2-hydroxybenzene-4-sulfonamide and its derivatives substituted in the sulfonamide group by alkyl or aryl radicals; 1-amino-2-hydroxy-3-nitro-benzene-5-sulfonamide, 1-amino-2-hydroxy-5-nitro-benzene-3-sulfonamide, 1-amino-2-hydroxy-5-chloro-benzene-4-sulfonamide, 1-amino-2-hydroxy-5-methyl-benzene-4-sulfonamide, 1-amino-2-hydroxybenzene-5-alkylsulfones, 1-amino-2-hydroxy-benzene-4-alkylsulfones. Finally may be used aminobenzenes which carry in ortho-position to the amino group a substituent capable of being converted into the hydroxy group as, for example, 1-amino-2,5-dimethoxy-benzene and 1-amino-2-methoxy-5-nitrobenzene.

Suitable coupling components are, for example, 2-phenyl-5-aminobenztriazole, 2-phenyl-5-amino-6-methyl-benztriazole, 2-phenyl-5-amino-6-methoxy-benztriazole, 2-phenyl-5-amino-6-chlorobenztriazole, 2-(3'-sulfamidophenyl)-5-aminobenztriazole, 2-(2'-methoxyphenyl)-5-aminobenztriazole, 2-(2'-chlorophenyl)-5-aminobenztriazole, 2-(2'-methoxy-5'-sulfomonomethylamido-phenyl)-5-amino-benztriazole, 2 - (2' - chlorophenyl) - 5 - amino-6-methylbenztriazole, 2 - (3' - methylsulfonylphenyl) - 5 - aminobenztriazole, 2 - (2' - nitrophenyl) - 5 - aminobenztriazole.

The coupling of the diazotised 1-amino-2-hydroxybenzenes with the 2-aryl-5-aminobenztriazoles may be effected in usual manner in neutral or weakly acid aqueous solution or suspension, expediently with the addition of dispersive substances or with water-miscible organic solvents.

The conversion of the dyestuffs thus obtained into their chromium or cobalt complexes can be carried out according to known methods, for example, by heating them with trivalent chromium salts in organic solvents at elevated temperatures or by converting them with bi-valent cobalt salts in neutral or alkaline solutions or suspensions.

The new metal complex monoazo dyestuffs thus obtainable are readily soluble in water and may be used for dyeing wool, silk, polyamide fibres and polyurethane fibres. They dye these materials from a neutral or weakly acid bath in level brown to green shades very fast to washing, milling, carbonizing, decatizing and to light.

The following examples illustrate the invention without, however, limiting it thereto; the parts by weight and by volume stand in the ratio of gram to milliliter.

Example 1

27 parts by weight of 1-amino-2-hydroxybenzene-5-sulfonic acid amide are diazotized in 150 parts by volume of water and 25 parts by volume of concentrated hydrochloric acid with 10 parts by weight of sodium nitrite in 30 parts by volume of water, and the suspension of the diazo compound is combined with a finely dispersed suspension of 30 parts by weight of 2-phenyl-5-aminobenztriazole in 200 parts by volume of water. Subsequently, the mixture is adjusted to a pH-value of 6 by slowly adding a soda solution, and the coupling is completed with stirring at 40–50° C. The mixture is heated to 70–80° C. and the dyestuff is filtered off. The dyestuff is hot dissolved by addition of 30 parts by volume of a 40% caustic soda solution in 1,000 parts by volume of water, and filtered off, and an ammoniacal solution of 19 parts by weight of crystalline cobalt chloride is introduced into the filtrate drop by drop. The metallisation is complete after a short time; the formed cobalt complex of the dyestuff corresponding to the formula

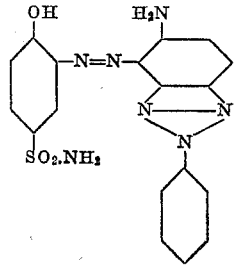

is completely separated by addition of common salt, filtered off and dried. It is a dark powder which dissolves in hot water with a violet-brown shade and dyes wool in level dark-brown shades very fast to washing, milling, carbonizing, decatizing and to light.

By using, instead of the above-mentioned diazo component, a corresponding quantity of 1-amino-2-hydroxybenzene-5-sulfonic acid methylamide, 1-amino-2-hydroxybenzene-5-methylsulfone or 1-amino-2-hydroxybenzene-5-ethylsulfone, dyestuffs of similar properties are obtained.

By using, instead of the above-indicated coupling components a corresponding quantity of 2-phenyl-5-amino-6-methylbenztriazole, a similar dyestuff is obtained.

Example 2

27 parts by weight of 1-amino-2-hydroxybenzene-4-sulfonic acid amide are diazotized in 150 parts by volume of water and 25 parts by volume of concentrated hydrochloric acid with 10 parts by weight of sodium nitrite in 30 parts by volume of water, and the suspension of the diazo compound is combined with a suspension of 30 parts by weight of 2-phenyl-5-aminobenztriazole in 150 parts by volume of formamide. The coupling is completed by adding 20 parts by weight of crystalline sodium acetate and by slightly heating the mixture. The mixture is then stirred with 500 parts by volume of hot water and filtered off with suction. The dyestuff paste thus obtained is dissolved in 1,000 parts by volume of hot water with the addition of caustic soda solution, filtered off and an ammoniacal solution of 19 parts by weight of crystalline cobalt chloride is added drop by drop to the filtrate while stirring at 90–95° C. After the metallization is complete, the product is worked up as described in Example 1. The cobalt complex of the dyestuff of the formula

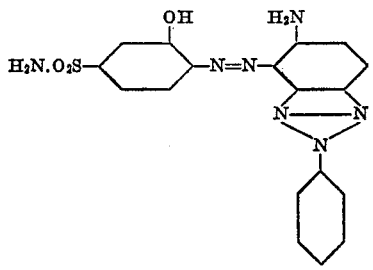

is obtained; it represents a black-brown powder which dissolves in hot water with a grey-brown color and dyes wool from a neutral bath in level black brown shades of very good fastness properties.

If instead of the above mentioned coupling component a corresponding quantity of 2-phenyl-5-amino-6-methyl-benztriazole is used, a dyestuff of similar properties is obtained.

Example 3

22 parts by weight of 1-amino-2-hydroxy-4-nitro-benzene are diazotized in 150 parts by volume of water and 30 parts by volume of concentrated hydrochloric acid with 10 parts by weight of sodium nitrite in 30 parts by volume of water. The suspension of the diazo compound is then combined with a suspension of 30 parts by weight of 2-(3'-sulfonamido-phenyl)-5-amino-benztriazole in 200 parts by volume of water, and 20 parts by weight of crystalline sodium acetate are added thereto in small portions. After the coupling is complete, the mixture is heated to 60–70° C., the dyestuff is filtered off and dried. This is stirred into 400 parts by volume of formamide, a concentrated aqueous solution of chromium formate containing 6.2 parts by weight of chromium oxide is added to the mixture which is stirred at 120–130° C. for about 3 hours until the chroming is finished. The mixture is poured into 1,500 parts by volume of a suturated common salt solution and the separated dyestuff is then filtered off. It is dissolved in 1,000 parts by volume of hot water with the addition of caustic soda solution, the solution is filtered off and the dyestuff is precipitated by adding common salt. The filtered and dried chromium complex of the dyestuff corresponding to the formula

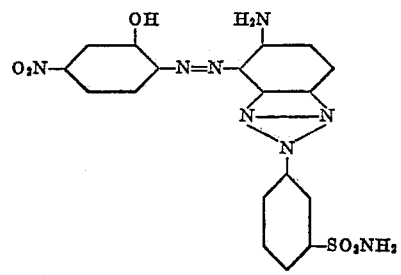

is a dark powder which dissolves in hot water with olive-green color and dyes wool from neutral bath in bluish green shades of very good fastness properties.

The cobalt complex of the same dyestuff dyes wool in yellowish olive shades of similar properties.

Example 4

60 parts by weight of the dyestuff prepared from diazotized 1-amino-2-hydroxy-3-nitrobenzene-5-sulfonic acid amide and 2-phenyl-5-aminobenztriazole are dissolved in 1,000 parts by volume of water with the addition of caustic soda solution; an ammoniacal solution of 19 parts by weight of crystalline cobalt chloride are added dropwise at 90–95° C. After stirring for one hour at the same temperature, the formed cobalt complex of the dyestuff of the formula

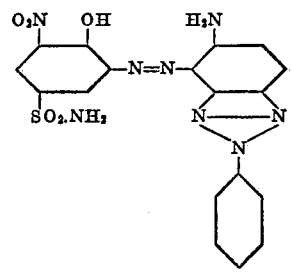

is separated by the addition of common salt, filtered off and dried. It forms a dark powder which dyes wool from a neutral bath in bluish olive shades of very good fastness to wetting and to light.

Example 5

54 parts by weight of the dyestuff from diazotized 1-amino-2-hydroxybenzene and 2-(3'-sulfonamido-phenyl-5-amino-benztriazole are dissolved in 1,000 parts by volume of water with the addition of caustic soda solution and at 90–95° C. there is added drop by drop an ammoniacal solution of 19 parts by weight of crystalline cobalt chloride. After the metallisation is complete, the cobalt complex of the dyestuff corresponding to the formula

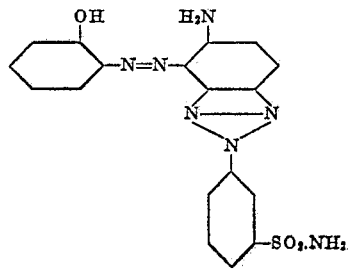

is separated with the addition of common salt, filtered off and dried. A dark brown powder is obtained which dissolves in hot water with a brown color and which dyes wool from a neutral bath in level olive-tinted brown shades of very good fastness to wetting and light.

Example 6

60 parts by weight of the dyestuff from diazotized 1-amino-2,5-dimethoxybenzene and 2-(3'-sulfamidophenyl)-5-amino-benztriazole are stirred into 500 parts by volume of formamide, 19 parts by weight of crystalline cobalt chloride and 15 parts by weight of crystalline sodium acetate are added thereto, and the mixture is stirred at 120–125° C. for 4 hours until the metallisation is complete. The mixture is then poured into 1,500 parts by volume of a saturated solution of common salt, the separated dyestuff is filtered off and washed. The dyestuff paste thus obtained is stirred into 500 parts by volume of water and 20 parts by volume of caustic soda solution, filtered off with suction and dried. The formed cobalt complex of the dyestuff having the formula

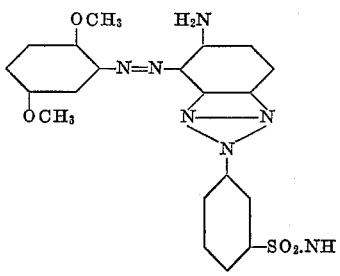

is a dark brown powder which dyes wool from a neutral bath in level olive-tinted grey shades of very good fastness properties.

| | Diazo component | Coupling component | Metal | Dyeing on wool |
|---|---|---|---|---|
| (7) | 1-amino-2-hydroxy-benzene-5-sulfonamide. | 2-phenyl-5-amino-benztriazole. | Cr | dark brown. |
| (8) | ----do---- | 2-phenyl-5-amino-6-methoxy-benztriazole. | Co | reddish dark brown. |
| (9) | ----do---- | ----do---- | Cr | yellowish brown. |
| (10) | 1-amino-2-hydroxy-5-nitro-benzene. | 2-(3'-sulfamidophenyl)-5-aminobenztriazole. | Co | yellowish olive. |
| (11) | 1-amino-2-hydroxy-3,5-dinitrobenzene. | ----do---- | Co | olive. |
| (12) | 1-amino-2-hydroxy-5-chloro-benzene-4-sulfonamide. | 2-phenyl-5-amino-benztriazole. | Co | dark brown. |
| (13) | ----do---- | ----do---- | Cr | Do. |
| (14) | 1-amino-2,5-dimethoxybenzene-4-sulfonic acid anilide. | ----do---- | Co | black-brown. |

Example 15

The benztriazole-dyestuff intermediates are obtainable e.g. as follows:

226 parts by weight of the azo dyestuff obtained from diazotized aniline and 2,4-diamino-toluene in form of a wet paste are stirred in an autoclave with a solution of 625 parts by weight of crystalline copper sulfate in 1500 parts by volume of 25 percent ammonia and 3,000 parts by volume of water within 4 hours at 120–125°. After the mixture is cooled the formed crystalline product is filtered with suction washed free from copper and dried. 2-phenyl-5-amino-6-methylbenztriazole is obtained in almost quantitative yield. After recrystallized in acetone the compound has a melting point of 218–219° C.

In analogous manner the following dyestuff intermediates can be prepared: 2-phenyl-5-amino-6-methoxybenztriazole, M. P. 186–187° C. 2-phenyl-5-amino-6-nitrobenztriazole, M. P. 217–218° C. 2-(3'-sulfamidophenyl)-5-aminobenztriazole, M. P. 288–290° C.

I claim:

1. A dyestuff selected from the group consisting of chromium complexes and cobalt complexes of a monoazo dyestuff corresponding to the general formula:

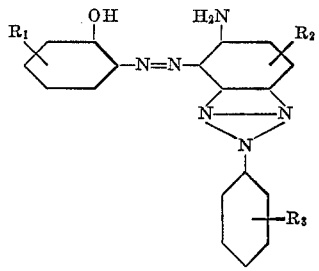

wherein $R_1$, $R_2$ and $R_3$ stand for radicals selected from the group consisting of hydrogen and non-ionic substituents.

2. A cobalt complex of the monoazo dyestuff corresponding to the formula:

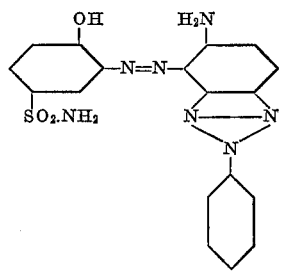

3. A cobalt complex of the monoazo dyestuff corresponding to the formula:

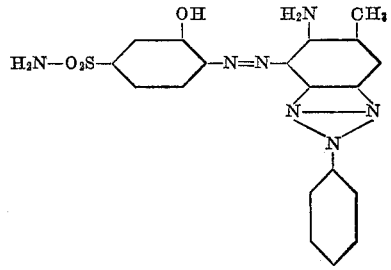

4. A cobalt complex of the monoazo dyestuff corresponding to the formula:

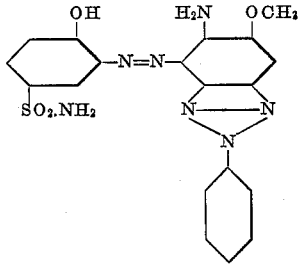

References Cited in the file of this patent
UNITED STATES PATENTS 2,315,220  Petitcolas et al. _____ Mar. 30, 1943

OTHER REFERENCES

Synthetic Dyes, Venkataraman, vol. 1, 1952, pages 540–541.